(12) United States Patent
Yamazaki et al.

(10) Patent No.: US 6,597,348 B1
(45) Date of Patent: Jul. 22, 2003

(54) INFORMATION-PROCESSING DEVICE

(75) Inventors: Shunpei Yamazaki, Tokyo (JP); Jun Koyama, Kanagawa (JP); Keisuke Hayashi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 09/471,348

(22) Filed: Dec. 23, 1999

(30) Foreign Application Priority Data

Dec. 28, 1998 (JP) .............................. 10-373302

(51) Int. Cl.$^7$ .................................................. G09G 5/00
(52) U.S. Cl. ...................... 345/175; 345/102; 178/18.09
(58) Field of Search ................ 345/176, 175, 345/179, 182, 183, 102, 173; 178/18.09, 18.11, 19.05

(56) References Cited

U.S. PATENT DOCUMENTS

| | | | | |
|---|---|---|---|---|
| 3,673,327 A | * | 6/1972 | Johnson et al. ................. | 178/18 |
| 4,868,551 A | * | 9/1989 | Arditty et al. ............... | 345/175 |
| 4,907,862 A | * | 3/1990 | Suntola ........................ | 345/102 |
| 4,963,859 A | * | 10/1990 | Parks .......................... | 345/175 |
| 5,359,345 A | * | 10/1994 | Hunter ......................... | 345/102 |
| 5,381,160 A | * | 1/1995 | Landmeier ..................... | 178/18 |
| 5,736,686 A | * | 4/1998 | Perret, Jr. et al. .............. | 178/18 |

FOREIGN PATENT DOCUMENTS

| | | |
|---|---|---|
| JP | 7-253853 | 10/1995 |
| JP | 9-073807 | 3/1997 |
| JP | 10-097200 | 4/1998 |
| JP | 10-186311 | 7/1998 |

\* cited by examiner

*Primary Examiner*—Regina Liang
(74) *Attorney, Agent, or Firm*—Cook, Alex, McFarron, Manzo, Cummings & Mehler, Ltd.

(57) ABSTRACT

An information-processing device which comprises a field sequential display unit and a touch panel, said sequential display unit having a back light to supply three-color light and an image display part which forms an image for one frame by the sequential time-sharing display of three subframes corresponding to said three-color light, and said touch panel having an optical guide plate of transparent material, an optical sensor array whose light receiving surface is opposite to the side of said optical guide plate, a lens sheet whose light emitting surface is opposite to that side of said optical guide plate which is opposite to said side, and an illuminating means to illuminate the plane of incidence of said lens sheet.

The information-processing device is superior in resistance to extraneous light, contamination, and mechanical shock and has a touch panel for high-precision display capable of accurately detecting positions and entering information.

40 Claims, 13 Drawing Sheets

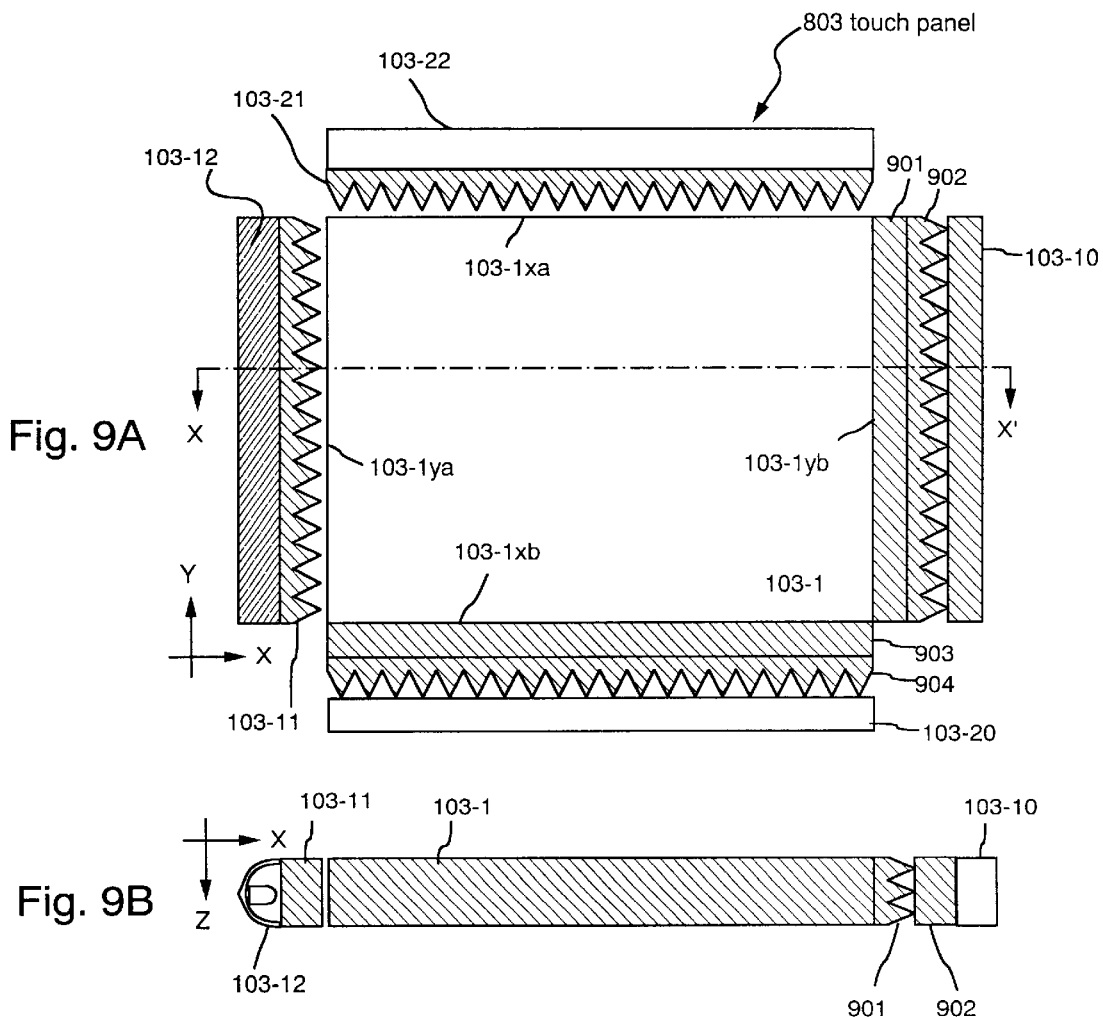

CMOS Circuit | Active Matrix Circuit 2002 touch panel
2003 LCD panel
2004 LED back light

2001

2000

2102 touch panel
2103 LCD panel
2104 LED back light

2100

INFORMATION-PROCESSING DEVICE

BACKGROUND OF THE INVENTION

1. Field of the Invention

The present invention relates to an information-processing device provided with a touch panel that permits one to input various kinds of information.

2. Description of the Related Art

The modern liquid-crystal display unit of active matrix type is the most noticeable among display units of all kinds. It finds general use for notebook-size personal computers. Personal computers require high-definition multiple-gradation displays so that they can invoke several kinds of software at one time and accept images from a digital camera.

In addition, there in an increasing demand for liquid-crystal display units of active matrix type which are small in size and yet capable of displaying with high definition, high resolution, and multiple gradation, with the recent spread of portable information terminals, mobile computers, car navigation systems, etc.

These devices are usually designed such that users enter information through other input units than keyboards. In the past, they merely had several switches for information input. However, a touch panel has recently come into use for information input in place of switches.

The conventional touch panel has a sensor of pressure-sensitive type or electrostatic capacity type formed on the entire surface of the panel. When the panel is touched by the tip of a pen or a finger, the sensor detects the position of touch. The touch panel of this structure has the disadvantage of requiring the sensors over the entire surface of the panel, presenting difficulties in production, and posing a problem with mechanical strength.

In order to eliminate the above-mentioned disadvantage, there has been proposed a touch panel of optical type (or photoelectric type) which has light emitting elements and light receiving elements arranged on the opposing sides of the panel. A touch panel of optical type is schematically shown in FIGS. 13A and 13B. FIG. 13A is a front view, and FIG. 13B is a sectional view taken along the line A–A' in FIG. 13A.

The panel shown in FIGS. 13A and 13B has light emitting elements from 3100a to 3100e which are linearly arranged on one side of the panel 3000 and also has light receiving elements from 3200a to 3200e which are linearly arranged on the opposite side of the panel. When the panel is touched by a finger, the ray from the light emitting element 3100b is interrupted at the position of touch. The light receiving element 3200b opposite to the light emitting element 3100b decreases in output signal. In other words, the position where the finger touches the panel is known from the position of the light receiving element which has decreased in output signal.

The disadvantage of the touch penal of optical type shown in FIGS. 13A and 13B however is that the ray (travelling through the air) is easily affected by extraneous light and the elements 3100 and 3200 easily get their surface dirty.

A touch panel free of the above-mentioned disadvantage is disclosed in Japanese Patent Laid-Open No. 7-253853. As shown in FIG. 14, it is composed of a flexible panel 4000 of anisotropic clear crystal and light emitting and receiving elements 4100 and 4200 which are linearly arranged on the opposing sides of the panel. These elements are close to the sides of the panel 4000 and hence less vulnerable to contamination.

The emergent rays from the light-emitting elements 4100 proceed along the optical path (a) and reach the light-receiving elements 4200. Upon pressing by a finger, the panel 4000 deforms, causing the emergent rays to proceed along the optical path (b). Thus, the emergent rays do not reach the light-receiving elements 4200, and hence the pressed part is detected. This touch panel is not affected by the extraneous light because it permits the emergent rays to proceed in the panel.

The above-mentioned touch panel (shown in FIG. 14) has the disadvantage that the panel 4000 deforms to affect the liquid crystal panel thereunder, with the cell gap varied. In addition, the pressed and deformed part may diffuse light in the panel 4000 instead of deflecting the optical path (b) outward if it has an inadequate radius of curvature. Diffused light prevents the detection of accurate positions.

Conventional touch panels have many problems and are unsatisfactory as mentioned above.

The touch panel as information input means for portable information terminals and car navigation systems is usually provided with a liquid-crystal display unit of active matrix type, as mentioned above. Unfortunately, it has the disadvantage of causing failures in data entry or point selection, because the conventional liquid-crystal display unit of active matrix type forms a color image from red, green, and blue pixels.

SUMMARY OF THE INVENTION

The present invention was completed to tackle the above-mentioned problems. It is an object of the present invention to provide a information-processing device, such as a portable information terminal, which is provided with a touch panel resistant to extraneous light, contamination, and mechanical shocks and capable of accurate information input and also with a fine liquid-crystal display unit.

The information-processing device according to the present invention comprises a field sequential display unit and a touch panel, said sequential display unit having a back light to supply three-color light and an image display part which forms an image for one frame by the sequential time-sharing display of three subframes corresponding to said three-color light, and said touch panel having an optical guide plate of transparent material, an optical sensor array whose light receiving surface is opposite to the side of said optical guide plate, a lens sheet whose light emitting surface is opposite to that side of said optical guide plate which is opposite to said side, and an illuminating means to illuminate the plane of incidence of said lens sheet.

Said three-color light may be supplied from a red LED, a green LED, and a blue LED.

Said transparent material may be one which has a refractive index of 1.4–1.7.

The plane of incidence of said lens sheet may have a plurality of prismatic or semicylindrical projections.

Said illuminating means may have an LED.

Said touch panel may have an input pen with which to touch the surface of said optical guide plate, and that part of said optical guide plate with which said input pen comes into contact may be formed from a transparent material which has a refractive index equal to or higher than that of the transparent material forming said optical guide plate.

Said touch panel may have an input pen with which to touch the surface of said optical guide plate, and the tip of said input pen is formed from a material which absorbs the illuminating light from said illuminating means.

Said display unit may be a liquid-crystal display unit.

BRIEF DESCRIPTION OF THE DRAWINGS

FIGS. 9A and 9B are schematic diagrams showing the structure of the touch panel incorporated into another embodiment of the information-processing device according to the present invention.

DESCRIPTION OF THE PREFERRED EMBODIMENTS

The information-processing device according to the present invention is explained below with reference to the following examples, which are not intended to restrict the scope of the invention.

EXAMPLE 1

Figure 1:
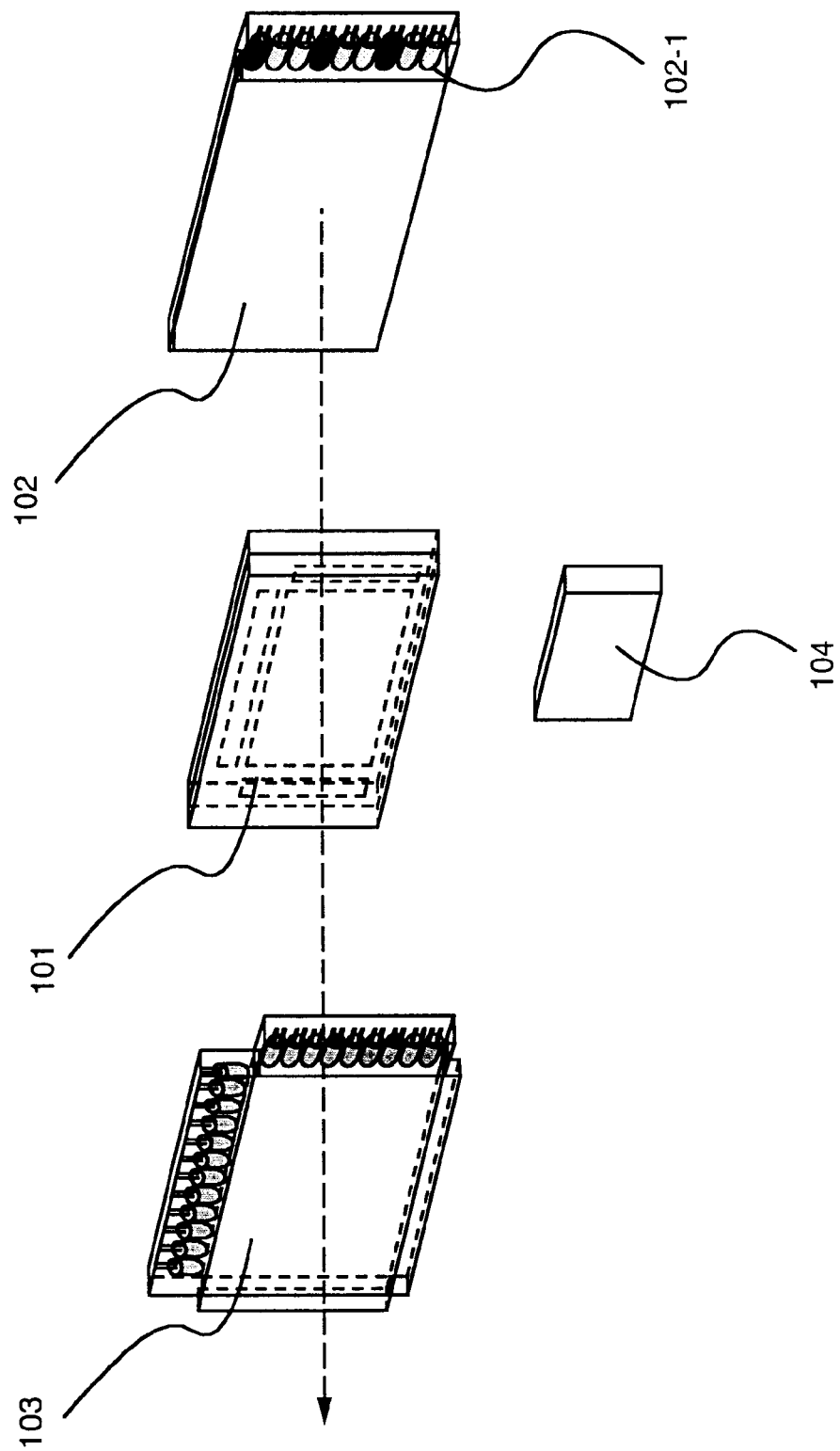
FIG. 1 is a schematic diagram showing the structure of one embodiment of the information-processing device according to the present invention.

The information-processing device according to the present invention is constructed as schematically shown in FIG. 1. Its main component is a liquid-crystal display unit 101 (which is referred to as LCD (liquid-crystal display) in this specification). The LCD panel 101 in this example contains a nematic liquid crystal in twist-nematic mode and has an 8-bit digital driver. The LCD panel 101 is provided with a LED back light 102 composed of a plurality of LED's 102-1 and an optical guide plate. The LCD panel 101 is provided also with a touch panel 103 through which the user enters information in the information-processing device of this example. The LCD panel 101 is connected to a computer 104 for numerical calculation, data storage, and control.

The LCD panel incorporated into the information-processing device of the present invention is one which is based on the field sequential drive system. This drive system divides one frame of image into three subframes sequentially and turns on the red, green, and blue back lights one after another at intervals corresponding to each subframe period (or ⅓ full frame period). Each of the three colors enters the LCD panel and visualizes the image corresponding to it. In this way the red, green, and blue subframes synthesize one image which is recognized by the user as a color display.

Figure 2:
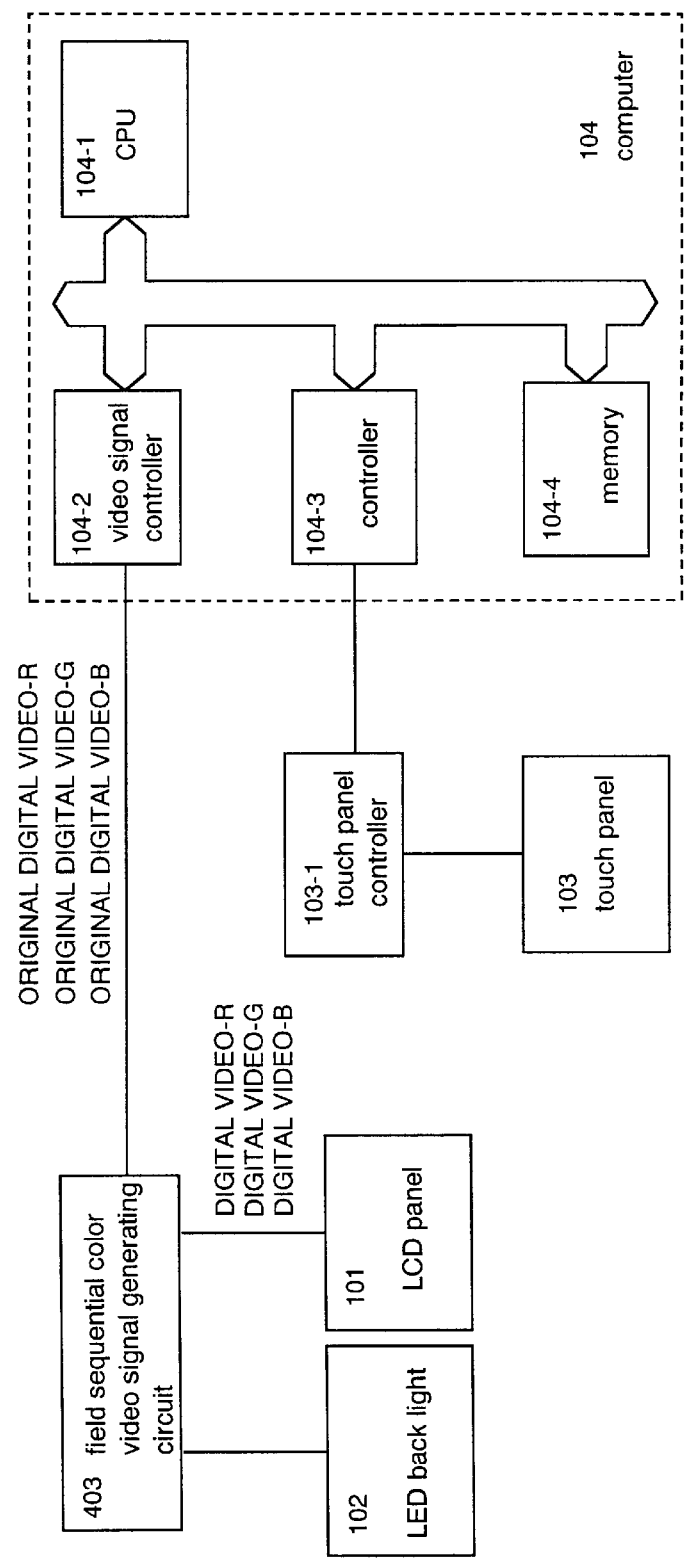
FIG. 2 is a block diagram showing the structure of one embodiment of the information-processing device according to the present invention.

The information-processing device according to the present invention is constructed of the following components as shown in FIG. 2 (block diagram).

Computer 104.

Central processing unit (CPU) 104-1.

Video signal controller 104-2 which controls video signals to be supplied to the LCD panel.

Controller 104-3 which controls the touch panel controller 103-1.

Touch panel controller 103-1 which controls the touch panel 103.

Memory 104-4.

Field sequential color video signal generating circuit 403, which generates video signals for the red, green, and blue subframes. It also supplies the LED back light 102 with signals to control the timing of turning on the LED.

The information-processing device according to the present invention may optionally have other devices connected thereto.

Figure 3:
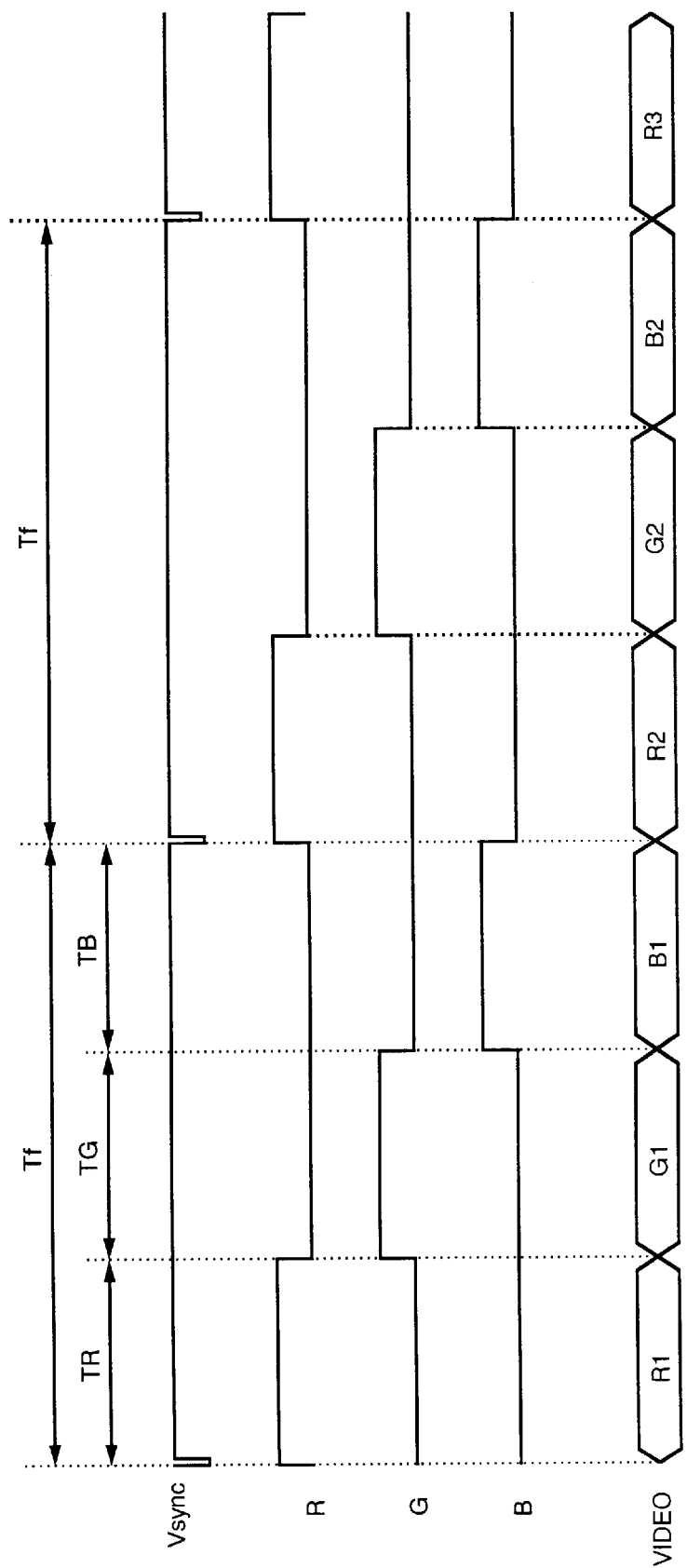
FIG. 3 is a timing chart for the field sequential drive system.

The LCD panel in the information-processing device according to the present invention is based on the field sequential drive system whose timing chart is shown in FIG. 3. In this chart, "Vsync" denotes the signals to start the writing of image signals, R, G, and B denote timing signals to turn on the respective red, green, and blue LED's, "VIDEO" denotes video signals, "Tf" denotes the frame period, and TR, TG, TB denote subframe periods at which red, green and blue images are shown, respectively.

The video signal (VIDEO) supplied to the LCD panel 101 has its original video signal (ORIGINAL DIGITAL VIDEO) supplied from the video signal controller 104-2 of the computer 104 compressed into one-third in the direction of time axis. For example, the video signal R1 supplied to the LCD panel 101 has its corresponding original video signal (ORIGINAL DIGITAL VIDEO-R) supplied from the video signal controller 104-2 compressed into one-third in the direction of time axis; the video signal G1 supplied to the LCD panel 101 has its corresponding original video signal (ORIGINAL DIGITAL VIDEO-G) supplied from the video signal controller 104-2 compressed into one-third in the direction of time axis; and the video signal B1 supplied to the LCD panel 101 has its corresponding original video signal (ORIGINAL DIGITAL VIDEO-B) supplied from the video signal controller 104-2 compressed into one-third in the direction of time axis.

In this example, the field sequential drive system shown in FIG. 3 works so as to turn on the R, G, and B LED's sequentially in the TR period, TG period, and TB period, respectively. In the TR period for red LED to be turned on, the video signal (R1) corresponding to red is supplied to the liquid crystal panel so that one red image is written in the liquid crystal panel. In the TG period for green LED to be turned on, the video signal (G1) corresponding to green is supplied to the liquid crystal panel so that one green image is written in the liquid crystal panel. In the TB period for blue LED to be turned on, the video signal (B1) corresponding to blue is supplied to the liquid crystal panel so that one blue image is written in the liquid crystal panel. Writing images three times forms one frame.

In this example, the LCD panel 101 is provided with an 8-bit digital driver; however, it may also be provided with a 6-bit or 10-bit digital driver or an analog driver. In the latter case, the LCD panel is supplied with analog signals from the field sequential color video signal generating circuit.

The information-processing device in this example is provided with the LCD panel based on the field sequential drive system as mentioned above, and this LCD panel gives three times as high resolution as the conventional one.

Figure 4A:
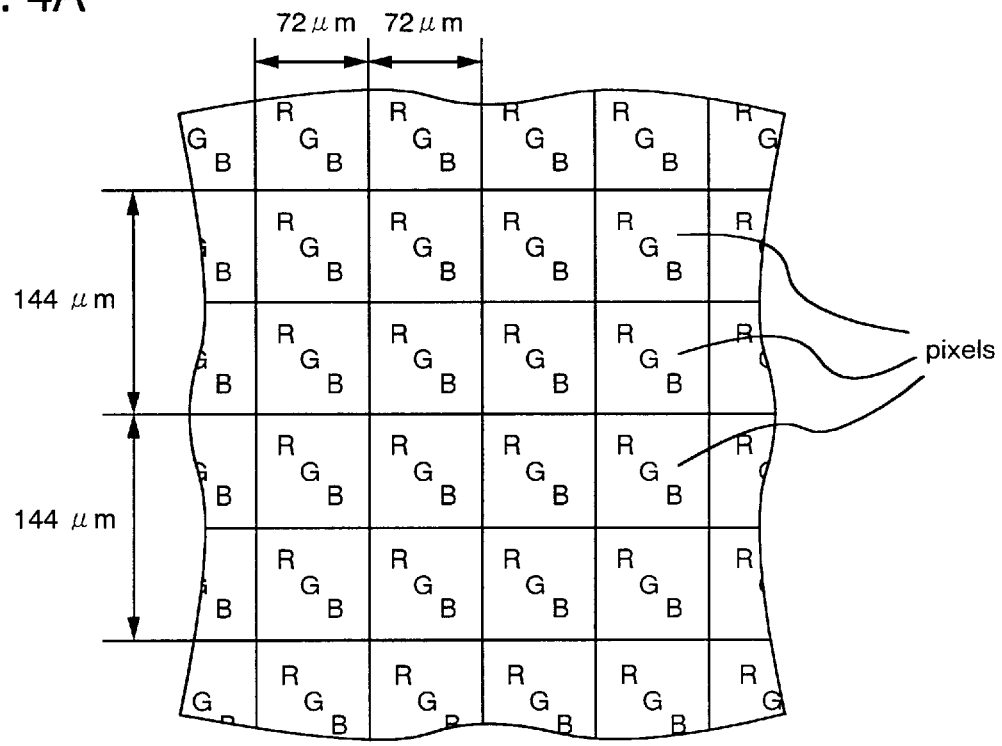
FIGS. 4A and 4B are enlarged views of pixels of an LCD panel of field sequential drive system and an enlarged view of pixels of a conventional LCD panel, respectively.
Figure 4B:
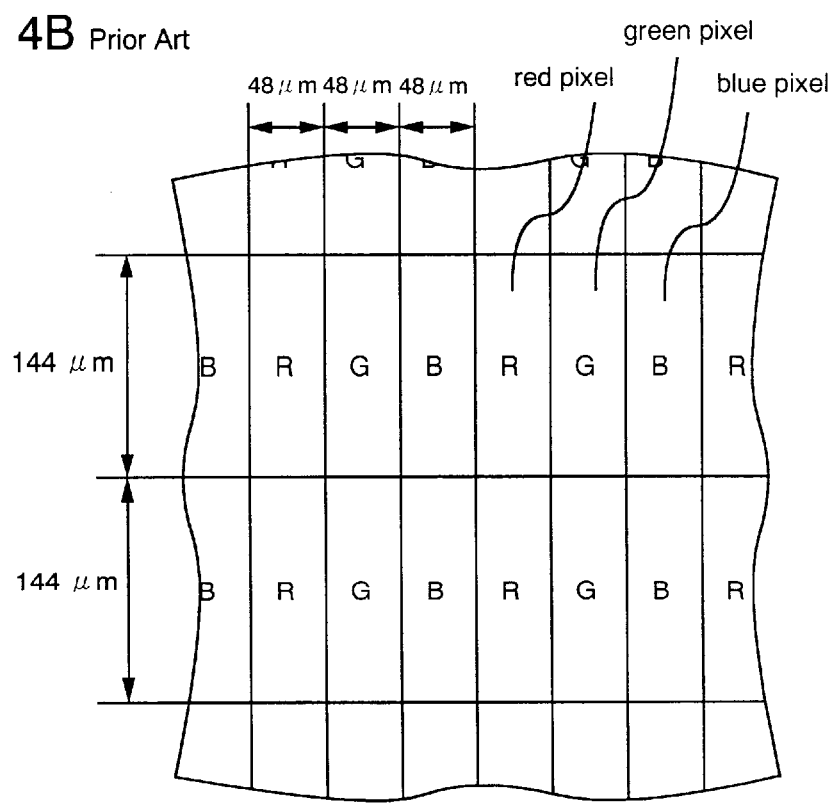

The LCD panel of the information-processing device in this example has an image display part whose partly enlarged view is shown in FIG. 4A. The image display part has a diagonal of about 4.5 inches and conforms to SXGA specification (1240×1024), with each pixel measuring 72×72 μm. Unlike the LCD panel in this example, the conventional one shown in FIG. 4B resorts to red, green, and blue pixels for color display. Therefore, it has a low resolution corresponding to VGA (640×480) even though it has the same diagonal and has a pixel size of 48×144 μm.

Figure 5A:
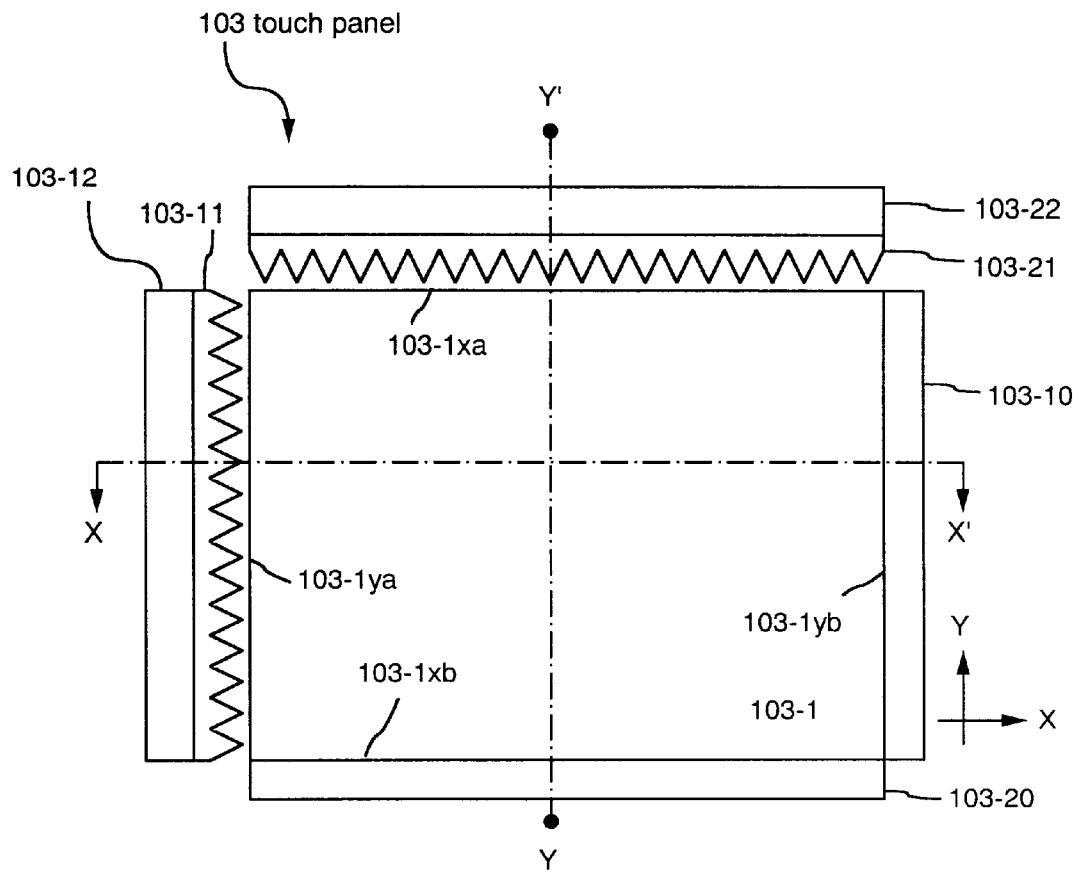
FIGS. 5A and 5B are schematic diagrams showing the structure of the touch panel incorporated into one embodiment of the information-processing device according to the present invention.
Figure 5B:

The information-processing device in this example is provided with the touch panel 103 which is constructed as schematically shown in FIGS. 5A and 5B. FIG. 5A is a front view and FIG. 5B is a sectional view taken along the line X–X' in FIG. 5A. The touch panel 103 in this example is surfaced with the optical guide plate 103-1 of transparent material. The optical guide plate 103-1 has the side 103-1$yb$ along which is arranged an optical sensor array 103-10 to detect the position in the Y axis (or the Y coordinate). Along the side 103-1$ya$ opposite to the side 103-1$yb$ is arranged the prism lens sheet 103-11, whose light emitting surface faces the side 103-1$ya$. The incident surface of the prism lens sheet 103-11 faces the illuminating unit 103-12.

The sectional view taken along the line Y–Y' is the same as that shown in FIG. 5B. The optical guide plate 103-1 has the side 103-1$xb$ along which is arranged an optical sensor array 103-20 to detect the position in the X axis (or the X coordinate). Along the side 103-1$xa$ opposite to the side 103-1$xb$ is arranged the prism lens sheet 103-21, whose light emitting surface faces the side 103-1$xa$. The incident surface of the prism lens sheet 103-21 faces the illuminating unit 103-12.

The touch panel 103 in this example has the optical guide plate 103-1 made of transparent material. This transparent material should have a transmittance greater than 80%, preferably greater than 85%, for visible light. In addition, according to the present invention, the transparent material forming the optical guide plate 103-1 should have a refractive index of 1.4–1.7.

Examples of the transparent material include inorganic glass, such as quartz glass and borosilicate glass (having a refractive index of 1.42–1.7 and a transmittance of 80–91%) and plastics exemplified below.

Methacrylic resin, such as polymethyl methacrylate (having a refractive index of 1.49 and a transmittance of 92–93%).
Polycarbonate (having a refractive index of 1.59 and a transmittance of 87–90%).
Polystyrene (having a refractive index of 1.59 and a transmittance of 88–90%).
Polyallylate (having a refractive index of 1.61 and a transmittance of 85%).
Poly-4-methylpentene-1 (having a refractive index of 1.46 and a transmittance of 90%).
AS resin [acrylonitrile-styrene copolymer] (having a refractive index of 1.57 and a transmittance of 90%).
MS resin [methyl methacrylate-styrene copolymer] (having a refractive index of 1.56 and a transmittance of 90%).

These plastics may be used in combination with one another.

In this specification, the refractive index is one which is measured with D-line (589.3 nm) from sodium in the air. The refractive index and transmittance of plastics are measured according to JIS K7105.

The optical guide plate 103-1 should have a thickness of 0.1–10 mm, preferably 3–7 mm. If excessively thin, it has difficulty in receiving light from its sides 103-1$xa$ and 103-1$ya$, which leads to a decrease in utilization of light from the illuminating units 103-12 and 103-22. If excessively thick, it causes the incident light through the surface 103-1$a$ and the reverse 103-1$b$ to diffuse therein, which lowers the accuracy of position detection.

Figure 7A:
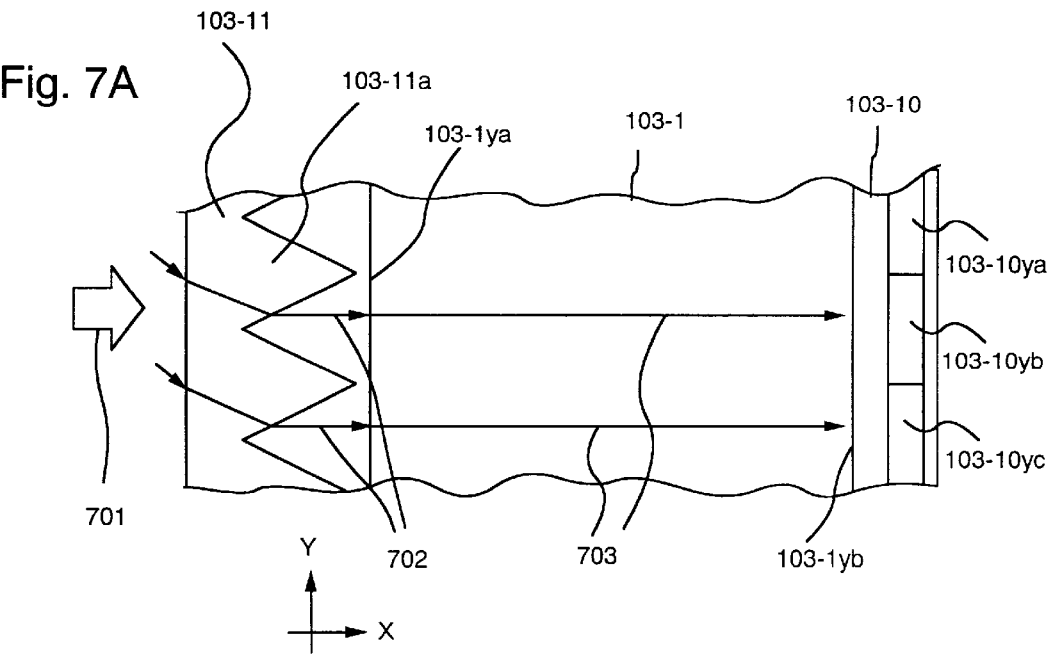
FIGS. 7A to 7C are diagrams showing the action of a touch panel used for one embodiment of the information-processing device according to the present invention.

The prism lens sheets 103-11 and 103-21 are intended to enhance the directivity of light from the illuminating units 103-12 and 103-22, respectively. The prism lens sheets 103-11 and 103-21 may be formed from the same transparent material as used for the above-mentioned optical guide plate. As shown in FIG. 7A, the prism lens sheet 103-11 has projections (like triangular prisms) 103-11$a$ formed continuously on its light emitting side. The prism lens sheet 103-21 also has a similar structure.

The illuminating unit 103-12 has the light source 103-13 and the reflection sheet 103-14, as shown in FIG. 5B. The reflection sheet 103-14 covers the back side of the light source 103-13 for effective use of light from the light source. The light source 103-13 may be light-emitting diodes (LED). In this example, the light source 103-13 is composed of LED's arranged linearly. This is effective in power saving. The illuminating unit 103-22 is constructed in the same way as the illuminating unit 103-12. The illuminating unit may be replaced by a fluorescent lamp which is used as the back light of an LCD panel.

In this example, the LED's used as the light source 103-13 are designed for pulse driving. This pulse may be the high-frequency clock pulse used for the field sequential driving of the LCD panel or LED back light.

The optical sensor arrays 103-10 and 103-20 are composed of optical sensors utilizing photovoltaic effect or photoconductivity effect. The optical sensors may be photodiodes, phototransistors, CdS cells, CdSe cells, etc. which are arranged in line. They may also be one-dimensional image sensors, such as CCD [charge coupled device], BBD [bucket bridge device], CID [charge injection device], CPD [charge priming device], and MOS type image sensor.

The optical sensor arrays 103-10 and 103-20 are in close contact with the sides 103-1$xb$ and 103-1$yb$, respectively, of the optical guide plate 103-1, so that they are immune to contamination and extraneous light. The gap between the optical guide plate 103-1 and the optical sensor arrays 103-10 and 103-20 is filled with a transparent resin having a refractive index higher than that of the optical guide plate 103-1 so as to ensure light transmission.

Figure 6A:
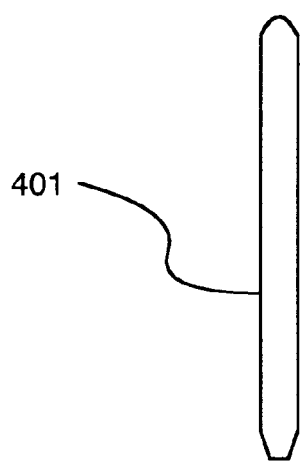
FIGS. 6A and 6B are diagrams showing input pens used for one embodiment of the information-processing device according to the present invention.

The touch panel in this example is designed to be touched by an input pen 401 shown in FIG. 6A. The input pen 401 has a tip (which comes into contact with the optical guide plate 103-1) made of a transparent material having a refractive index equal to or greater than that of the optical guide plate 103-1. The input pen 401 in this example is made entirely of a transparent material having a refractive index higher than that of the optical guide plate 103-1, so that the pen as a whole functions as the optical guide.

The transparent material from which the tip of the input pen 401 is formed may be selected from the above-mentioned materials for the optical guide plate 103-1. For example, the optical guide plate 103-1 is formed from polymethyl methacrylate (having a refractive index of 1.49) and the input pen 401 is formed from polycarbonate (having a refractive index of 1.59).

In addition, the tip of the input pen 401 should preferably be made of resilient plastics rather than glass so that it comes into close contact with the surface 103-1a of the optical guide plate 103-1.

Figure 7B:
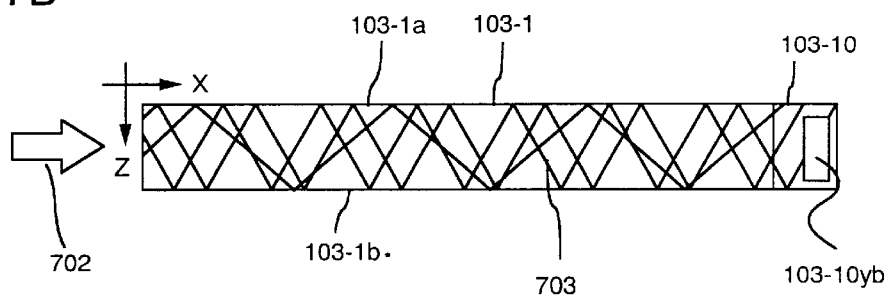
Figure 7C:
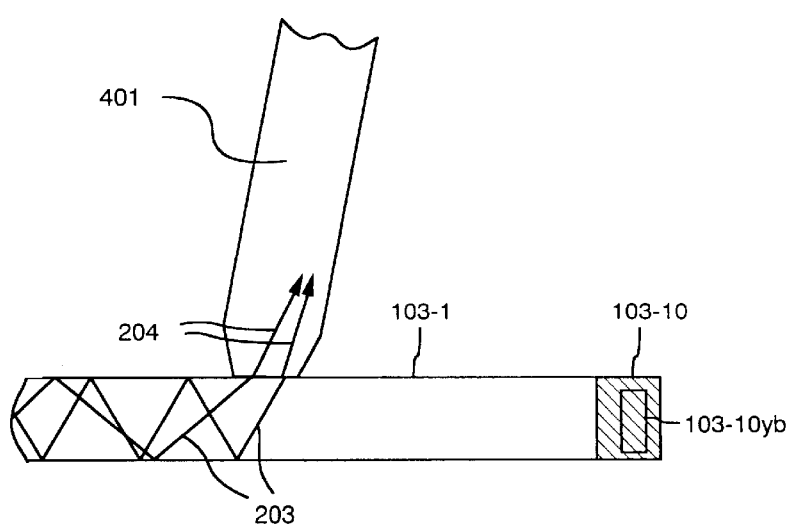

The touch panel in this example functions as shown in FIGS. 7A to 7C. FIG. 7A is a front view showing a part of the panel. FIGS. 7B and 7C are sectional views. In FIG. 7A, the optical sensor array 103-10 consists of unit sensors 103-10ya, 103-10yb, and 103-10yc. Each unit sensor corresponds to one photodiode element or one pixel of one-dimensional sensor. Variation in the amount of light received by these unit sensors is electrically detected so that the input position in the Y-axis is detected. The optical sensor array 103-20 is also constructed in the same way as the optical sensor array 103-10.

The light 701 emerging from the illuminating unit 103-12 illuminates the light receiving surface of the prism lens sheet 103-11 and enters the prism lens sheet 103-11. The incident light is condensed in the Y-axis direction by the prisms projection 103-11a of the prism lens sheet 103-11. Thus the emergent light 702 has a narrow divergent angle. In other words, the light 701 enters the prism sheet 103-11 at irregular angles. Then it is refracted by the slope of the projection 103-11a. Thus, the light 702 is condensed into the Y-axis direction and is increased in the directivity in the X-axis direction. In other words, the light 703 entering the optical guide plate 103-1 travels along the X-axis without spreading into the Y-axis in the optical guide plate 103-1.

Although the light 702 is not condensed into the Z-axis direction (in the thickness direction of the optical guide plate) by the prism lens sheet 103-11, it is refracted at the side 103-1yb and directed inward even though the incident angle (with respect to the side 103-1ya of the optical guide plate 103-1) is close to 90 degrees, because the optical guide plate 103-1 has a refractive index of 1.4–1.7.

The optical guide plate 103-1 has a higher refractive index than air, so that the light 703 incident on the optical guide plate 103-1 undergoes total reflection by the front 103-1a and the reverse 103-1b and transmits from the side 103-1ya to the side 103-1yb, as shown in FIG. 7B.

The light 702 is not condensed in the Z-axis direction (in the thickness direction of the optical guide plate) by the prism lens sheet 103-11, as mentioned above. Consequently, the light 702 enters the optical guide plate 103-1 at irregular angles and the light 703 undergoes total reflection at irregular angles as indicated by solid lines in FIG. 7B. In other words, it is reflected by any part of the surface 103-1a of the optical guide plate. Because of this structure, the light 703 is not reflected by one specific part of the surface 103-1a of the optical guide plate 103-1. Therefore, it is possible to detect the position with certainty.

In this example, the light 703 is given a strong directivity in the X-axis direction by the prism lens sheet 103-11;

therefore, the light 702 emerging from a specific part of the projection 103-11a is received by a specific unit sensor of the light sensor array 103-10. In other words, the light is received almost entirely by the unit sensor opposite to that projection 103-11a.

In addition, extraneous light entering the optical guide plate 103-1 from the surface 103-1a(the reverse 103-1b) emerges from the reverse 103-1b (the front 103-1a), with very little diffusion in the optical guide plate 103-1. Therefore, it does not affect the optical sensor arrays 103-10 and 103-20.

Incidentally, the lens sheet should condense rays with different incident angles in one direction, as the prism lens sheets 103-11 and 103-21 do. The same effect as mentioned above can be obtained with a lenticular lens sheet having semicylindrical projections.

A mention was made above with reference to FIGS. 7A and 7B of the process in which the light 701 from the illuminating unit 103-12 is received by the optical sensor array 103-10. The same explanation as above is applied to the process in which the light from the illuminating unit 103-22 is received by the optical sensor array 103-20, except that the light transmits in the Y-axis direction.

The light from the illuminating unit 103-22 is condensed in the X-axis direction by the prism lens sheet 103-21. In other words, it is not condensed in the Z-axis direction and it is given a high directivity in the Y-axis direction. Finally, it emerges from the prism lens sheet 103-21. The emergent light enters the optical guide plate 103-1, transmits through it, while undergoing total reflection therein, and finally emerges from its side 103-1xb. The emergent light is received by the optical sensor array 103-20.

In order to enter the position, the user touches the surface 103-1a of the optical guide plate 103-1 with the input pen 401, as shown in FIG. 7C. Since the input pen 401 has a higher refractive index than the optical guide plate 103-1, the light 703 is deflected almost entirely at the place of contact of the input pen 401. The deflected light 203 enters the input pen 401 and this results in a decrease in the amount of light received by the unit sensor 103-10yb of the optical sensor array 103-10. The position of this unit sensor 103-10yb is detected as the position in the Y-axis direction (Y coordinate) of the tip of the input pen 401. In the same way as this, the position in the X-axis direction is also detected by the optical sensor array 103-20. Thus it is possible to detect the position of contact of the input pen 401 two-dimensionally (X-coordinate and Y-coordinate).

In this example, the light 702 is not condensed in the Z-axis direction by the prism lens sheet 103-11, as mentioned above. Therefore, the light 703 entering the optical guide plate 103-1 is reflected at every position in the surface 103-1a of the optical guide plate. Therefore, it is possible to detect the position with certainty.

This can be understood by taking into account the case in which the light 703 is reflected at a specific position on the surface 103-1a of the optical guide plate. If the light is condensed in the Z-axis direction, the angle of incidence on the sides 103-1ya and 103-1xa is fixed and the reflection angle at the front 103-1a and the reverse 103-1b of the optical guide plate is fixed. It follows, therefore, that the light 703 is reflected at a specific position on the surface 103-1a of the optical guide plate. The result is that when the input pen 401 is brought into contact with the position where the light 703 is not reflected, no change occurs in the amount of light received by the optical sensor array and hence the input position is not detected.

In this example, the light 702 emerging from the prism lens sheet is not condensed in the Z-axis direction and hence the angle of incidence on the side 103-1y*a* of the optical guide plate is random. The light 703 can be reflected at every position on the front 103-1*a* and the reverse 103-1*b* of the optical guide plate. Therefore, it is possible to detect the input position with certainty.

In order to increase variation in the amount of light received by the unit sensor of the optical sensor arrays 103-11 and 103-21, it is desirable to make provision so that the light 204 introduced into the input pen 401 does not enter the optical guide plate 103-1. This object may be achieved by guiding the light 703 to the outside of the optical guide plate 103-1 by utilizing the effect of refraction as well as the effect of absorption.

Figure 6B:
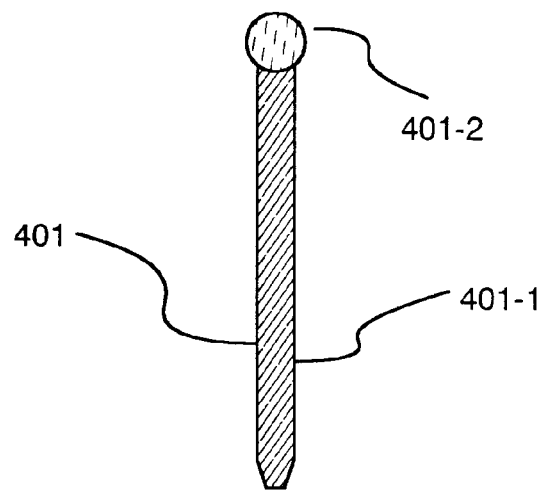

In this case, the light guiding part 401-1 of the input pen 401 should be made of a transparent material and the light absorbing part 401-2 of the pen bottom should be made of a colored resin, as shown in FIG. 6B. The light absorbing part 401-2 functions also as a decoration of the input pen. The light guiding part of the input pen 401 constructed as shown in FIG. 6B readily guides the light 703 into it even though it has the same refractive index as the optical guide plate 103-1.

In this example, the pen holder (including the pen point) should be made of a transparent material so that the light is introduced thereinto. So long as this requirement is met, the input pen may have any decoration.

It is possible to enter the position not only with the input pen made of a transparent material but also with a finger tip or a colored pen point. In this case, the light 703 is absorbed at the part with which the finger tip comes into contact and hence the diffused light reaching the optical sensor array decreases in intensity. Incidentally, the pen point should be colored such that the light absorption is highest for the wavelength of the illuminating light 701.

The information-processing device in this example employs the LCD panel of field sequential drive system, so that it is capable of high-precision display. Therefore, it permits the user to touch the desired point with certainty without the possibility of making any input miss while confirming the display on the LCD panel and entering information through the touch panel.

EXAMPLE 2

Figure 8:
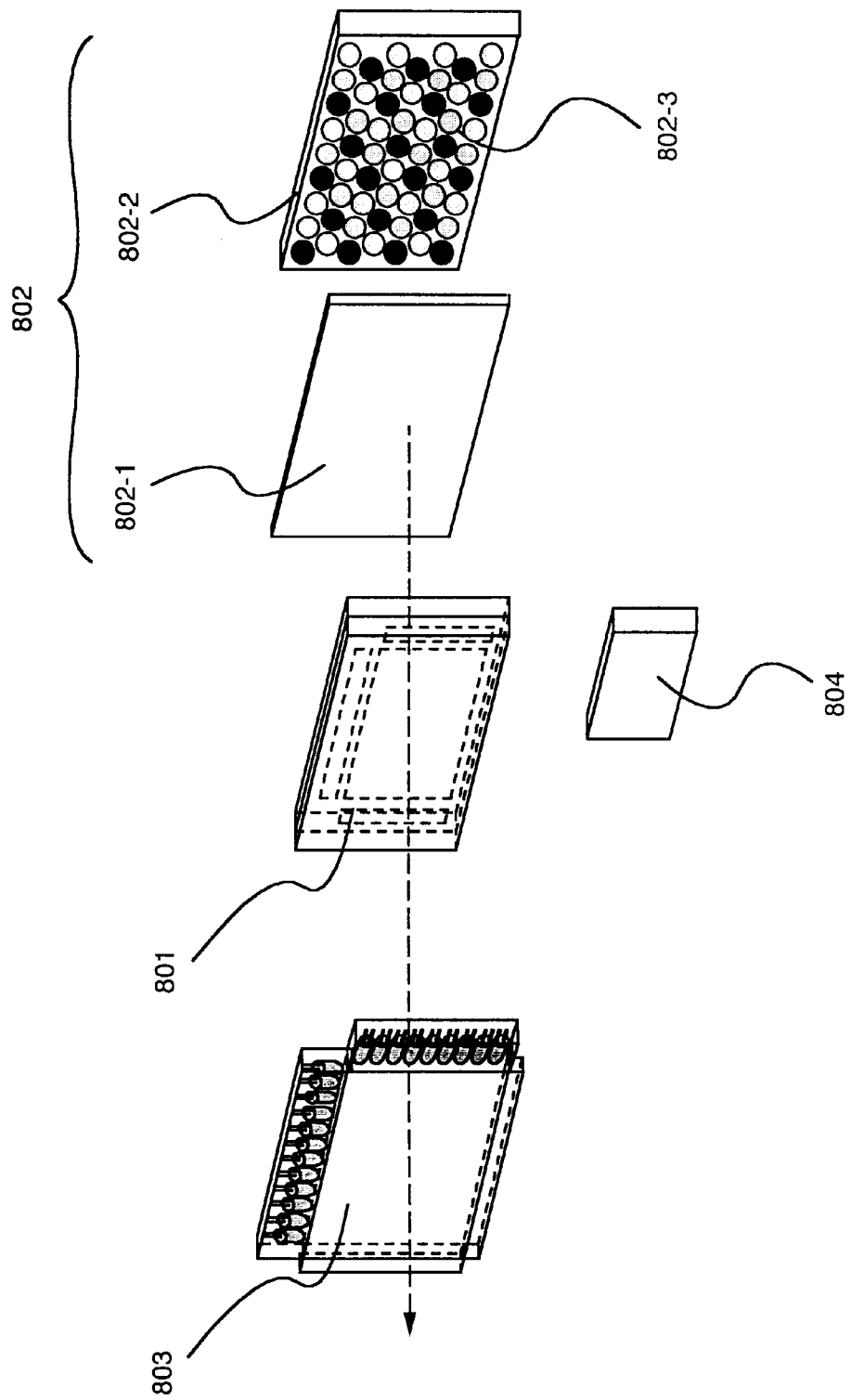
FIG. 8 is a schematic diagram showing the structure of another embodiment of the information-processing device according to the present invention.

The information-processing device in this example is constructed as schematically shown in FIG. 8. It consists of an LCD panel 801, an LED back light 802, an optical guide plate 802-1, an LED array 802-2, and a touch panel 803. The LED array 802-2 consists of a plurality of LED's 802-3 arranged regularly. The touch panel 803 in this example is slightly different in structure from that in Example 1. There is also shown a computer 804 for arithmetic calculations, data storage, and controls.

Other constructions than mentioned above are the same as in Example 1 and hence their explanation is omitted here.

The touch panel 803 in this example is explained with reference to FIGS. 9A and 9B. FIG. 9A is a front view, and FIG. 9B is a sectional view taken along the line X–X' in FIG. 9A. The touch panel 803 in this example is a modification of the touch panel 103 in Example 1. In FIGS. 9A and 9B, the same constituents as in the touch panel 103 in Example 1 are given identical reference numbers.

The touch panel 803 in this example is designed such that the light introduced into the optical guide plate 103-1 is effectively received by the optical sensor arrays 103-10 and 103-20. A pair of prism lens sheets 901 and 902 are interposed between the optical guide plate 103-1 and the optical sensor array 103-10. Likewise, a pair of prism lens sheets 903 and 904 are interposed between the optical guide plate 103-1 and the optical sensor array 103-20.

The prism lens sheets 901 and 903 are in close contact with the sides 103-1*yb* and 103-1*xb* of the optical guide plate 103-1, respectively. The prism lens sheets 901 and 902 and the prism lens sheets 903 and 904 are arranged such that the prism surfaces are perpendicular to each other.

Owing to the above-mentioned structure, the light emerging from the side 103-1*yb* of the optical guide plate 103-1 is condensed in the Z-axis direction by the prism lens sheet 901 and then condensed in the Y-axis direction, so that it is received effectively by the optical sensor array 103-10.

On the other hand, the light emerging from the side 103-1*xb* is condensed in the Z-axis direction by the prism lens sheet 903 and then condensed in the X-axis direction by the prism lens sheet 904, so that it is received by the optical sensor array 103-20.

Incidentally, the light emerging from the sides 103-1*yb* and 103-1*xb* of the optical guide plate 103-1 is condensed in the Y-axis direction and X-axis direction by the prism lens sheets 103-11 and 103-21, respectively. Therefore, the prism lens sheets placed in front of the optical sensor arrays 103-10 and 103-20 may be replaced by the lens sheets 901 and 903 which condense the light in the Z-axis direction.

In addition, the prism lens sheets 901~904 may be replaced by lenticular lens sheets.

EXAMPLE 3

Tis example demonstrates the process for producing the LCD panel used in the information-processing device in Example 1 or 2. The process in this example consists of forming TFT's (thin film transistors) on a substrate having an insulating surface, and then integrally forming active matrix circuits, drive circuits, and logic circuits constituting the image display unit. This example shows how to form simultaneously a pixel of active matrix type and a CMOS circuit (as the basic circuit such as drive circuit and logic circuit). It is also possible to form simultaneously the field sequential color signal generating circuit (explained in Example 1 or 2) and the LCD panel. The CMOS circuit explained in this example is one in which the p-channel type TFT (PFT) and the n-channel type TFT (NTFT) each has one gate electrode. It is also possible to produce in the same way CMOS circuits in which the TFT has a plurality of gate electrodes, like double gate type or triple gate type.

Refer to FIGS. 10A to 10E and 11A and 11B. The substrate 7001 is alkali-free glass substrate typified by #1737 of Corning Glass. The surface of the substrate 7001 on which TFT's are formed is coated with a base film 7002 (200 nm thick) of silicon oxide. The base film 7002 may optionally be coated with a silicon nitride film.

On the base film 7002 is formed an amorphous silicon film (50 nm thick) by plasma CVD. The amorphous silicon film should preferably be heated at 400–500° C. (depending on the hydrogen content) so that the hydrogen content is reduced to 8 atm % or less. The amorphous silicon film undergoes crystallization so that it is made into a crystalline silicon film.

This crystallization may be accomplished by known laser crystallization or thermal crystallization. In this example, this object is achieved by irradiating the amorphous silicon film with a condensed KrF excimer laser beam of pulse oscillating type.

In this example, the process starts with an amorphous silicon film; however, the amorphous silicon film may be replaced by a microcrystalline silicon film, or it is possible to form a crystalline silicon film directly.

The thus formed crystalline silicon film is patterned to give a semiconductor active layers 7003, 7004, and 7005 in the island pattern.

The semiconductor active layers 7003, 7004, and 7005 are covered with a gate insulating film 7006 composed mainly of silicon oxide or silicon nitride. To be concrete, a 100 nm thick film of silicon nitride oxide is formed by CVD method. A first conductive film of tantalum (Ta) is formed by sputtering (10–200 nm, say, 50 nm in thickness), and then a second conductive film of aluminum (Al) is formed by sputtering (100–1000 nm, say, 200 nm in thickness). By the known patterning technique, there are formed first conductive films 7007, 7008, 7009, and 7010 and there are formed second conductive films 7012, 7013, 7014, and 7015, where a first conductive film and a second conductive film constitute a first gate electrode.

The second conductive film constituting the first gate electrode may be formed from pure aluminum or aluminum alloy containing 0.1–5 atm % of titanium, silicon, or scandium. It may also be formed from copper. In this case, it is desirable to form a silicon nitride film (not shown) on the gate insulating film 7006.

What is shown in FIGS. 10A to 10E is constructed such that a storage capacitor is formed at the drain side of the n-channel type TFT constituting the pixel matrix circuit. The wiring electrodes 7011 and 7016 for the storage capacitor are formed from the same material as used for the first gate electrode.

Figure 10A:
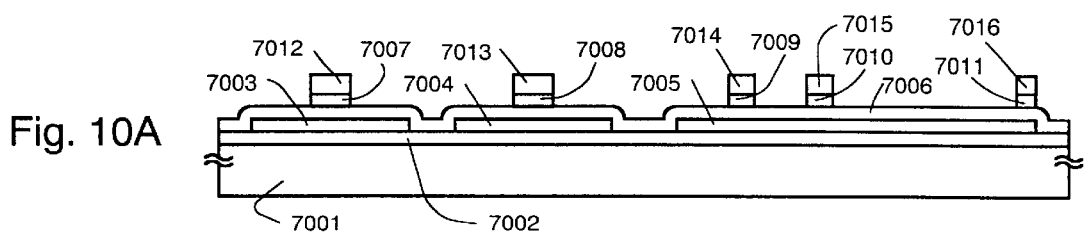
FIGS. 10A to 10E are diagrams showing the production of an LCD panel incorporated into one embodiment of the information-processing device according to the present invention.

The step of forming the structure in FIG. 10A is followed by doping with an n-type impurity. Among known impurity elements to impart the n-type to crystalline semiconductor materials are phosphorus (P), arsenic (As), and antimony (Sb). In this step, the object is achieved by ion doping of phosphine ($PH_3$). The accelerating voltage is set at 80 keV, which is slightly high, so that phosphorus is added to the underlying semiconductor layer through the gate insulating film 7006. The thus formed impurity region forms the first impurity regions 7034, 7042 and 7046 for the n-channel type TFT (mentioned later), and hence it functions as the LDD region. The concentration of phosphorus in this region should preferably be in the range of $1\times10^{16}$~$1\times10^{19}$ atms/cm$^3$. A range of $1\times10^{18}$ atms/cm$^3$ is adopted in this example.

The above-mentioned impurity element added to the semiconductor active layer needs activation by laser annealing or heat treatment. This step may follow the step of adding an impurity to form the source-drain region. However, activation by laser annealing in this step is effective.

Figure 10B:
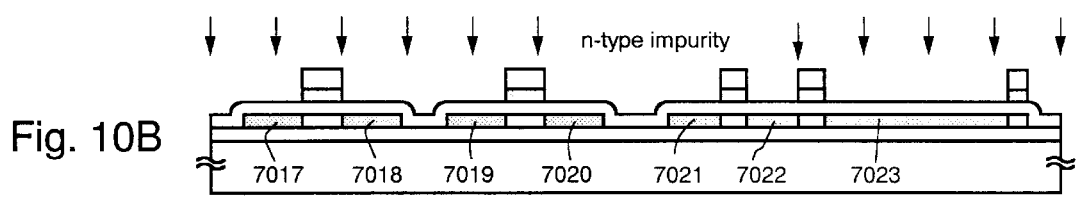

The first conductive films (7007, 7008, 7009 and 7010) and the second conductive films (7012, 7013, 7014 and 7015) constituting the first gate electrode function as the mask when phosphorus is added. As the result, phosphorus is not or hardly added to the region directly below the first gate electrode of semiconductor layer which is present through the gate insulating film. Thus, there are formed impurity regions 7017, 7018, 7019, 7020, 7021, 7022, and 7023 containing phosphorus in low concentrations, as shown in FIG. 10B.

Figure 10C:
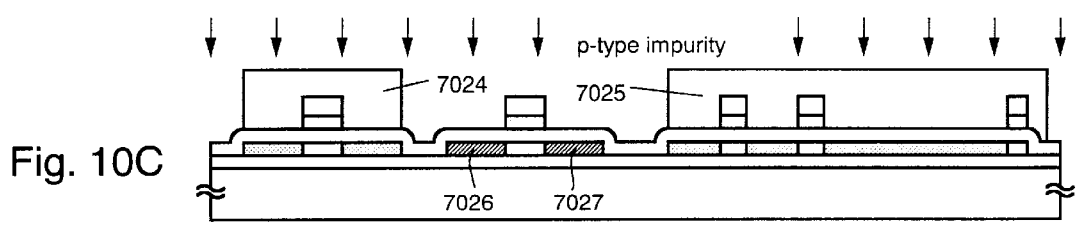

The region in which the n-channel type TFT is formed is covered with the resist masks 7024 and 7025, and an impurity to impart the p-type is added only to the region in which the n-channel type TFT is formed. Among known impurity elements to impart the p-type are boron (B), aluminum (Al), and gallium (Ga). In this step, the object is achieved by ion doping of diborane ($B_2H_6$). The accelerating voltage is set at 80 keV, boron is added in a concentration of $2\times10^{20}$ atms/cm$^3$. In this way there is formed the region 7026 and 7027 containing boron in high concentrations as shown in FIG. 10C. This region becomes later the source-drain region of the p-channel type The resist masks 7024 and 7025 are removed and then the second gate electrode is formed from tantalum (Ta), 100–1000 nm, say, 200 nm, in thickness. By any known patterning technique, the second gate electrodes 7028, 7029, 7030, and 7031 are formed. The second gate electrode formed in this way is the region (1.5 μm long) in contact with the gate insulating film adjacent to the both sides of the first gate electrode.

On the drain side of the n-channel type TFT constituting the pixel matrix circuit is formed the storage capacitor. The electrode 7032 of the storage capacitor is formed at the same time when the second gate electrode is formed.

The second step of adding an impurity element to impart the n-type is carried out by using the second gate electrodes 7028, 7029, 7030 and 7031 as the mask. This step is achieved by ion doping with phosphine ($PH_3$). The accelerating voltage is set at 80 keV, which is slightly high. The phosphorus-doped region contains phosphorus in concentrations of $1\times10^{19}$~$1\times10^{21}$ atms/cm$^3$, particularly $1\times10^{20}$ atms/cm$^3$ in this example, so that it functions as the source regions 7035 and 7043 and the drain regions 7036 and 7047 in the n-channel type TFT.

There is an alternative way (not shown) in which the gate insulating film covering the source regions 7035 and 7043 and the drain regions 7036 and 7047 is removed such that the semiconductor layer in this region is exposed and phosphorus is doped directly into it. This makes it possible to lower the accelerating voltage for ion doping to 10 keV and permits efficient phosphorus doping.

Phosphorus in the same concentration is added to the source region 7039 and the drain region 7040 of the p-channel type TFT. This step does not bring about the inversion of conductivity type because boron has been added in twice as high concentration as phosphorus in the previous step. The action of the p-channel type TFT is not affected at all.

The impurity element to impart the n-type or p-type remains inactive until it is activated. Activation is accomplished by thermal annealing (that employs an electric furnace), laser annealing (that employs an excimer laser), or rapid thermal annealing (RTA) (that employs a halogen lamp).

Activation by thermal annealing is accomplished by heating at 550° C. for 2 hours in an atmosphere of nitrogen. In this example, the second conductive film constituting the first gate electrode is made of aluminum. Nevertheless, the diffusion of aluminum atoms into the other regions is prevented because the first conductive film of tantalum and the second gate electrode are so formed as to cover aluminum and tantalum functions as a blocking layer. Activation by laser annealing is accomplished by concentrating KrF excimer laser beams of pulse oscillating type. Thermal annealing after laser annealing produces a better result. This step also produces the effect of annealing the region in which crystallinity has been destroyed by ion doping, and hence it improves the crystallinity in that region.

In the steps mentioned above, the first gate electrode and the second gate electrode covering the first gate electrode are formed, and the source region and the drain region are formed on both sides of the second gate electrode in the n-channel type TFT. In addition, the first impurity region formed in the semiconductor layer through the gate insulating film and the region in which the second gate electrode is adjacent to the gate insulating film are formed one over another by self-alignment. On the other hand, in the p-channel type TFT, the source region and the drain regions partly overlap with the second gate electrode. However, this poses no practical problem. Also, it is needless to say that reference numerals 7033, 7037, 7041 and 7045 denote channel regions. Reference numeral 7048 denotes a low concentration impurity region.

Figure 10D:
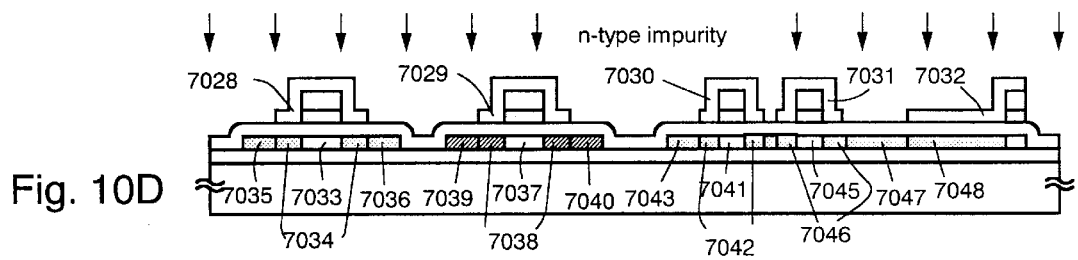

After the step of FIG. 10D has been completed, the first interlayer insulating film 7049 (1000 nm thick) is formed. The first interlayer insulating film 7049 may be silicon oxide film, silicon nitride film, silicon nitride oxide film, organic resin film, or a laminate thereof. In this example (although not shown), a 50-nm thick silicon nitride film is formed and then a 950-nm thick silicon oxide film is formed, so that a two layer structure is obtained.

The first interlayer insulating film 7049 undergoes patterning so that contact holes are formed in the source region and drain region of TFT. Subsequently, the source electrodes (7050, 7052 and 7053) and the drain electrodes (7051 and 7054) are formed. In this example (although not shown), this electrode is formed by patterning from a three layer film composed of titanium film (100 nm thick), titanium-containing aluminum film (300 nm thick), and titanium film (150 nm thick) which are formed consecutively by sputtering.

Figure 10E:
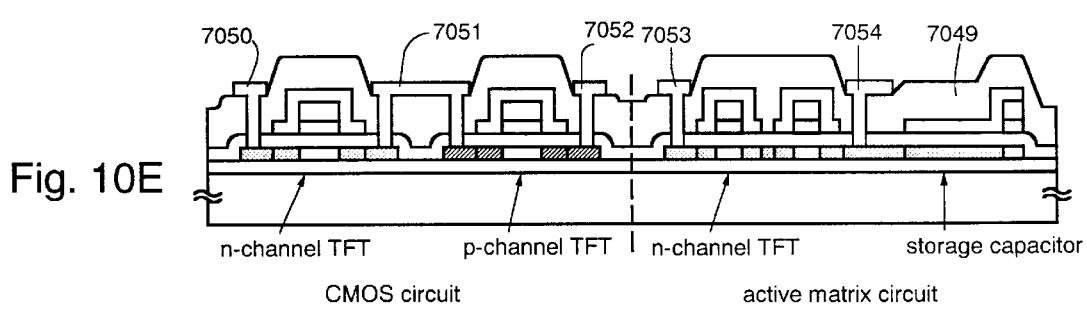

In this way the CMOS circuit and active matrix circuit are formed on the substrate 7001, as shown in FIG. 10E. At the same time, the storage capacitor is formed at the drain side of the n-channel type TFT of the active matrix circuit. The active matrix substrate is formed as mentioned above.

Now, the CMOS circuit and the active matrix circuit formed on the same substrate as mentioned above are used to form the LCD panel. This step will be explained below with reference to FIGS. 11A and 11B. First, on the substrate shown in FIG. 10E are formed the source electrodes (7050, 7052 and 7053), the drain electrodes (7051 and 7054), and the passivation film 7055 covering the first interlayer insulating film 7049. The passivation film 7055 is a 50-nm thick silicon nitride film. The passivation film 7055 is covered with a second interlayer insulating film 7056 which is about 1000 nm thick and is formed from an organic resin. Examples of the organic resin include polyimide, acryl, and polyimideamide. The organic resin film is easy to form, decreases the parasitic capacity because of its low dielectric constant, and has a smooth surface. Other organic resin film than mentioned above may be used. In this example, a polyimide film capable of thermal polymerization after application onto the substrate is used. It is baked at 300° C. after coating.

Second, the light screening layer 7057 is formed in part of the pixel region of the second inter layer insulating film 7056. The light screening layer 7057 may be a metal film or a film formed from an organic resin containing a pigment. In this example, it is formed from titanium by sputtering.

Then, the third interlayer insulating film 7058 is formed from an organic resin, like the second interlayer insulating film 7056. Between the second interlayer insulating film 7056 and the third interlayer insulating film 7058 is formed a contact hole reaching the drain electrode 7054, and then the pixel electrode 7059 is formed. The pixel electrode 7059 may be a transparent conductive film (in the case of a liquid crystal display unit of transmission type) or a metal film (in the case of a liquid crystal display unit of reflection type). In this example, the pixel electrode 7059 is a 100 nm thick ITO (indium-tin oxide) film which is formed by sputtering.

Figure 11A:
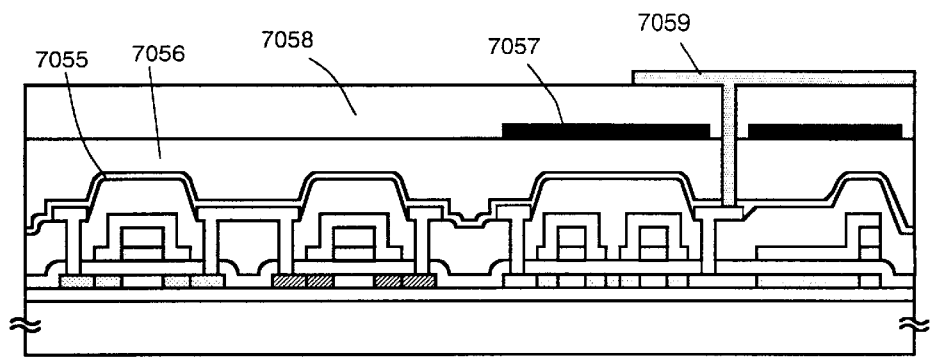
FIGS. 11A and 11B are diagrams showing the production of an LCD panel incorporated into one embodiment of the information-processing device according to the present invention.

After the step shown in FIG. 11A is completed, an alignment layer 7060 is formed. The alignment layer for the ordinary liquid-crystal display element is usually made of polyimide resin. On the opposing substrate 7071 are formed the opposing electrode 7072 and the alignment layer 7073. The alignment layer 7073 undergoes rubbing so that the liquid crystal molecules are oriented parallel at a prescribed pretilt angle.

Figure 11B:
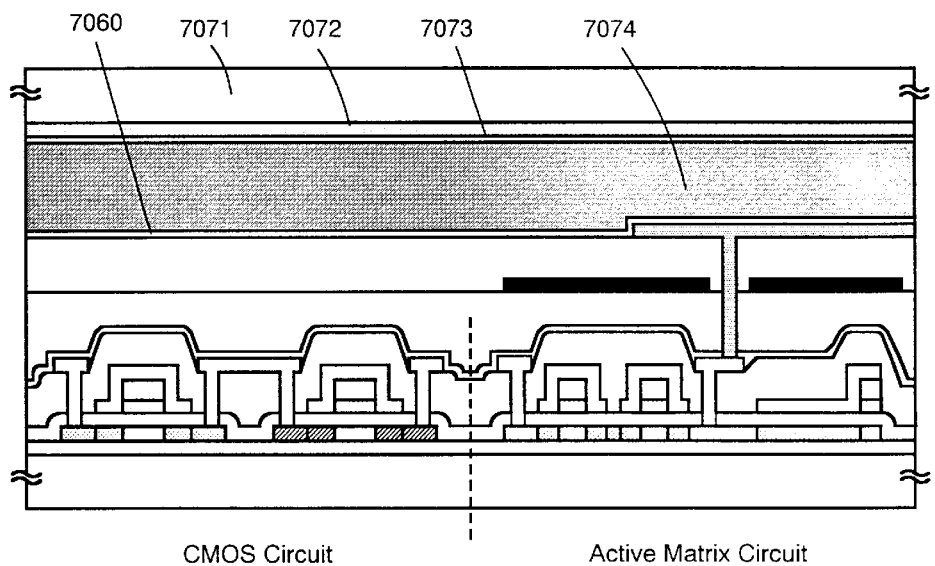

The substrate (on which are formed the active matrix circuit and the CMOS circuit) and the opposing substrate are assembled into a cell in the usual way, with a sealing material and a spacer interposed between them (not shown). The space between the two substrates is filled with the liquid crystal material 7074 and sealed completely with a sealing material (not shown). Thus, the LCD panel as shown in FIG. 11B is completed.

EXAMPLE 4

Figure 12A:
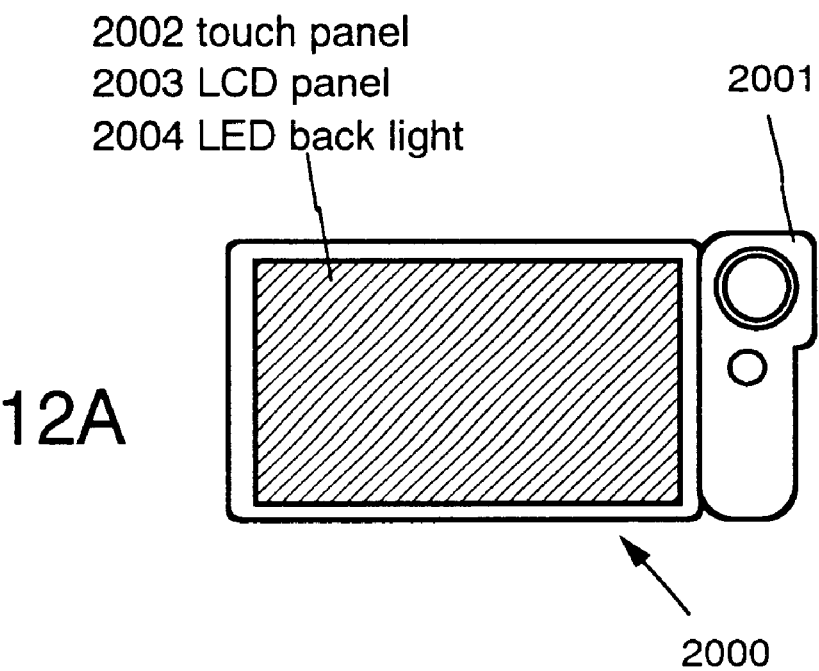
FIGS. 12A and 12B are diagrams showing one embodiment of the information-processing device according to the present invention.
Figure 12B:
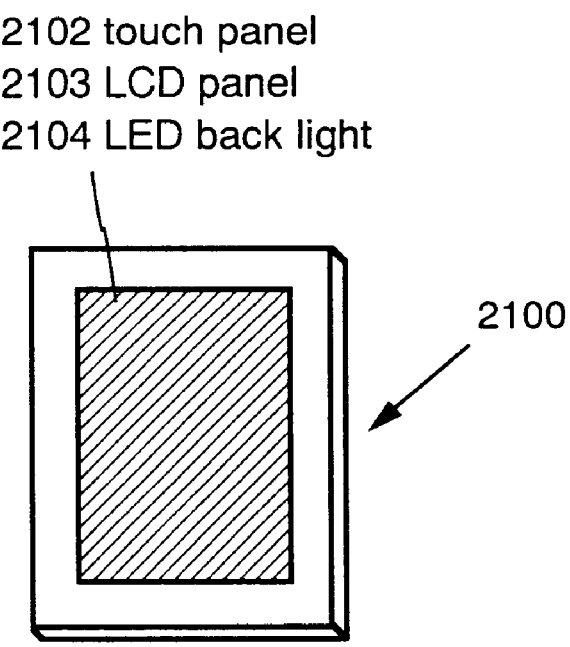
Figure 13A:
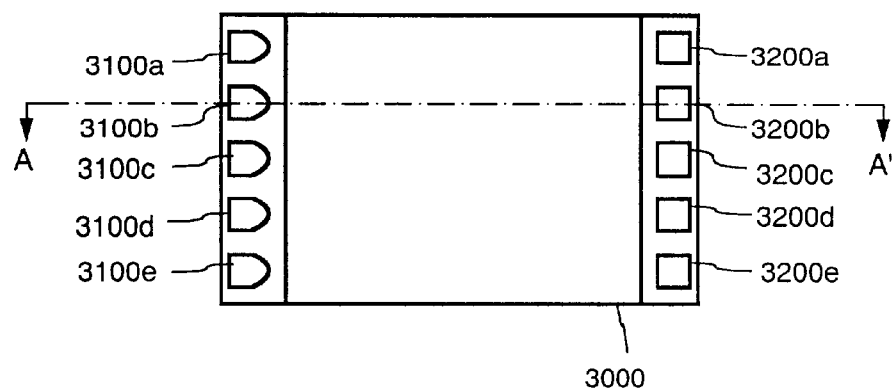
FIGS. 13A and 13B are diagrams showing a conventional touch panel.
Figure 13B:
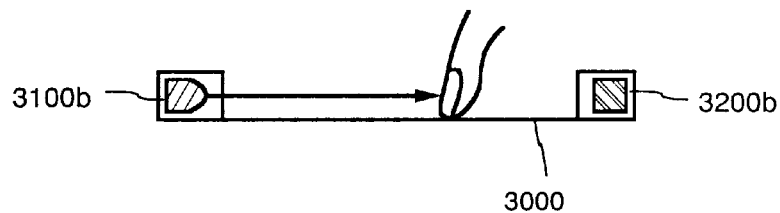
Figure 14:
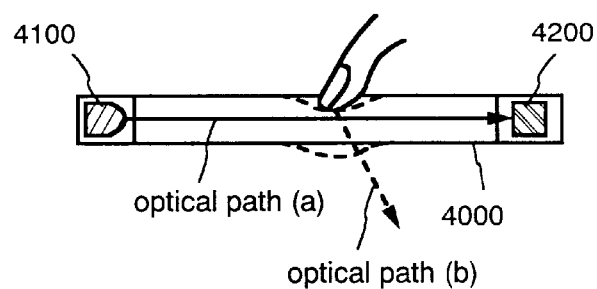
FIG. 14 is a diagram showing another conventional touch panel.

This example demonstrates, with reference to FIGS. 12A and 12B, a keyboardless information terminal which is provided with the information-processing device according to Example 1 or 2.

There is shown in FIG. 12A an information terminal 2000 with communication functions (such as WWW browsing and electronic mailing) which is provided with a digital camera 2001. It employs the information-processing device of the present invention.

There is shown in FIG. 12B an electronic note 2100 with communication functions. It employs the information-processing device of the present invention.

The information-processing device of the present invention has a touch panel which permits input through the optical guide plate. Therefore, it is simple in structure and superior in shock resistance. It is suitable for the portable information terminal as shown in FIGS. 12A and 12B.

The information-processing device of the present invention may be applied not only to the information terminal shown in FIGS. 12A and 12B but also to electronic machines and equipment of all kinds with touch panels, such as ticket vending machines, automatic teller machines (ATM), and office machines (such as facsimile and copier).

EXAMPLE 5

The information-processing device in Examples 1 to 4 mentioned above employs as the display unit an LCD panel with nematic liquid crystal. However, this display unit may be replaced by that of different kind which employs a display medium which changes in optical properties in response to the voltage applied. For example, it is possible to use a ferroelectric liquid crystal or antiferroelectric liquid crystal. It is also possible to use an organic EL(electroluminescent) panel.

The information-processing device of the present invention employs an LCD panel of field sequential drive system, so that it permits high-precision display. Therefore, the user can confirm the display on the LCD panel and enter information through the touch penal by accurately touching the desired point, without the possibility of making an input miss.

What is claimed is:
1. An information-processing device comprising:
   a field sequential display unit having a back light to supply three-color light and an image display part which forms an image for one frame by a sequential time-sharing display of three subframes corresponding to said three-color light;

a touch panel having an optical guide plate of a transparent material, an optical sensor array whose light receiving surface is opposite to a first side of said optical guide plate, a lens sheet whose light emitting surface is opposite to a second side of said optical guide plate which is opposite to said first side, and an illuminating means to illuminate a plane of said lens sheet; and an input pen to touch a surface of said optical guide plate, a portion of said input pen comprises a transparent material which has a refractive index equal to or higher than that of the transparent material of said optical guide plate.

2. An information-processing device according to claim 1 wherein said three-color light is supplied from a red LED, a green LED, and a blue LED.

3. An information-processing device according to claim 1 wherein said transparent material has a refractive index of 1.4–1.7.

4. An information-processing device according to claim 1 wherein said lens sheet has a plurality of prismatic or semicylindrical projections.

5. An information-processing device according to claim 1 wherein said illuminating means is an LED.

6. An information-processing device according to claim 1 wherein said display unit is a liquid crystal display unit.

7. An information-processing device according to claim 1 wherein said information-processing device is an electronic note.

8. An information-processing device comprising:

a liquid crystal display unit having at least a back light and an image display part;

a touch panel having an optical guide plate of a transparent material;

an optical sensor array whose light receiving surface is opposite to a first side of said optical guide plate;

a lens sheet whose light emitting surface is opposite to a second side of said optical guide plate which is opposite to said first side;

an illuminating means to illuminate a plane of said lens sheet; and an input pen to touch a surface of said optical guide plate, a portion of said input pen contacting said surface of said optical guide plate comprising a transparent material having a refractive index equal to or higher than that of said optical guide plate.

9. An information-processing device according to claim 8 wherein said transparent material has a refractive index of 1.4–1.7.

10. An information-processing device according to claim 8 wherein said illuminating means comprises an LED.

11. An information-processing device according to claim 8 wherein said lens sheet has a plurality of prismatic or semicylindrical projections.

12. An information-processing device according to claim 8 wherein said information-processing device is an electronic note.

13. An information-processing device according to claim 8 wherein said liquid crystal display unit comprises a ferroelectric liquid crystal.

14. An information-processing device according to claim 8 wherein said liquid crystal display unit comprises an antiferroelectric liquid crystal.

15. An information-processing device comprising:

a liquid crystal display unit having at least a back light and an image display part;

a touch panel having an optical guide plate of a transparent material;

an optical sensor array whose light receiving surface is opposite to a first side of said optical guide plate;

a lens sheet whose light emitting surface is opposite to a second side of said optical guide plate which is opposite to said first side;

an illuminating means to illuminate a plane of said lens sheet; and an input pen to touch a surface of said optical guide plate a tip of said input pen comprising a material which absorbs an illuminating light from said illuminating means.

16. An information-processing device according to claim 15 wherein said transparent material has a refractive index of 1.4–1.7.

17. An information-processing device according to claim 15 wherein said illuminating means comprises an LED.

18. An information-processing device according to claim 15 wherein said lens sheet has a plurality of prismatic or semicylindrical projections.

19. An information-processing device according to claim 15 wherein said information-processing device is an electronic note.

20. An information-processing device according to claim 15 wherein said liquid crystal display unit comprises a ferroelectric liquid crystal.

21. An information-processing device according to claim 15 wherein said liquid crystal display unit comprises an antiferroelectric liquid crystal.

22. An information-processing device comprising:

an EL display panel;

a touch panel having an optical guide plate of a transparent material;

an optical sensor array whose light receiving surface is opposite to a first side of said optical guide plate;

a lens sheet whose light emitting surface is opposite to a second side of said optical guide plate which is opposite to said first side;

an illuminating means to illuminate a plane of said lens sheet; and an input pen to touch a surface of said optical guide plate, a portion of said input pen contacting said surface of said optical guide plate comprising a transparent material having a refractive index equal to or higher than that of said optical guide plate.

23. An information-processing device according to claim 22 wherein said transparent material has a refractive index of 1.4–1.7.

24. An information-processing device according to claim 22 wherein said illuminating means comprises an LED.

25. An information-processing device according to claim 22 wherein said lens sheet has a plurality of prismatic or semicylindrical projections.

26. An information-processing device according to claim 22 wherein said EL display panel comprises an organic EL display panel.

27. An information-processing device according to claim 22 wherein said information-processing device is an electronic note.

28. An information-processing device comprising:

an EL display panel;

a touch panel having an optical guide plate of a transparent material;

an optical sensor array whose light receiving surface is opposite to a first side of said optical guide plate;

a lens sheet whose light emitting surface is opposite to a second side of said optical guide plate which is opposite to said first side;

an illuminating means to illuminate a plane of said lens sheet; and an input pen to touch a surface of said optical guide plate, a tip of said input pen comprising a material which absorbs an illuminating light from said illuminating means.

29. An information-processing device according to claim 28 wherein said transparent material has a refractive index of 1.4–1.7.

30. An information-processing device according to claim 28 wherein said illuminating means comprises an LED.

31. An information-processing device according to claim 28 wherein said lens sheet has a plurality of prismatic or semicylindrical projections.

32. An information-processing device according to claim 28 wherein said EL display panel comprises an organic EL display panel.

33. An information-processing device according to claim 28 wherein said information-processing device is an electronic note.

34. An information-processing device comprising:

a field sequential display unit having a back light to supply three-color light and an image display part which forms an image for one frame by a sequential time-sharing display of three subframes corresponding to said three-color light;

a touch panel having an optical guide plate of a transparent material, an optical sensor array whose light receiving surface is opposite to a first side of said optical guide plate, a lens sheet whose light emitting surface is opposite to a second side of said optical guide plate which is opposite to said first side, and an illuminating means to illuminate a plane of said lens sheet; and an input pen to touch a surface of said optical guide plate, a tip of said input pen comprises a material which absorbs an illuminating light from said illuminating means.

35. An information-processing device according to claim 34 wherein said three-color light is supplied from a red LED, a green LED, and a blue LED.

36. An information-processing device according to claim 34 wherein said transparent material has a refractive index of 1.4–1.7.

37. An information-processing device according to claim 34 wherein said lens sheet has a plurality of prismatic or semicylindrical projections.

38. An information-processing device according to claim 34 wherein said illuminating means is an LED.

39. An information-processing device according to claim 34 wherein said display unit is a liquid crystal display unit.

40. An information-processing device according to claim 34 wherein said information-processing device is an electronic note.

* * * * *